United States Patent
Rissanen et al.

(10) Patent No.: US 10,158,641 B2
(45) Date of Patent: *Dec. 18, 2018

(54) SYSTEM AND METHOD FOR EVALUATING A REVERSE QUERY

(71) Applicant: AXIOMATICS AB, Stockholm (SE)

(72) Inventors: Erik Rissanen, Kista (SE); Pablo Giambiagi, Stockholm (SE)

(73) Assignee: AXIOMATICS AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,296

(22) Filed: May 8, 2017

(65) Prior Publication Data

US 2017/0244711 A1    Aug. 24, 2017

Related U.S. Application Data

(63) Continuation of application No. 14/748,903, filed on Jun. 24, 2015, now Pat. No. 9,646,164, which is a (Continued)

(30) Foreign Application Priority Data

Dec. 30, 2010    (SE) ...................................... 1051394

(51) Int. Cl.
*G06F 17/00* (2006.01)
*H04L 29/06* (2006.01)
*G06F 21/62* (2013.01)

(52) U.S. Cl.
CPC .............. *H04L 63/10* (2013.01); *G06F 21/62* (2013.01); *G06F 2221/2141* (2013.01)

(58) Field of Classification Search
CPC ... H04L 63/10; G06F 21/62; G06F 2221/2141
(Continued)

(56) References Cited

U.S. PATENT DOCUMENTS 7,272,613 B2 * 9/2007 Sim ................... G06F 17/30067
  707/999.01
7,437,362 B1   10/2008 Ben-Natan
(Continued)

FOREIGN PATENT DOCUMENTS

EP         1879120 A1     1/2008
WO    WO 2006/118659 A2   11/2006
(Continued)

OTHER PUBLICATIONS

Carsten Binnig; Reverse Query Processing; IEEE 2007; p. 506-515.*

(Continued)

*Primary Examiner* — Monjur Rahim
(74) *Attorney, Agent, or Firm* — Buchanan Ingersoll & Rooney P.C.

(57) ABSTRACT

Real-time techniques for determining all access requests to an attribute-based access control policy which evaluate to a given decision, "permit" or "deny". The policy is enforced to control access to one or more resources in a computer network. In one embodiment, a method includes: (i) receiving a reverse query and a set of admissible access requests, each of which includes one or more attributes in the policy and values of these; (ii) extracting attributes to which all access requests in the set assign identical values; (iii) reducing the ABAC policy by substituting values for the extracted attributes; (iv) caching the policy as a simplified policy; (v) translating the simplified policy and the given decision into a satisfiable logic proposition; (vi) deriving all solutions satisfying the proposition; and (vi) extracting, based on the solutions, all access requests from the set for which the policy yields the given decision.

14 Claims, 5 Drawing Sheets

Related U.S. Application Data continuation-in-part of application No. 13/695,880, filed as application No. PCT/SE2011/050955 on Jul. 19, 2011, now Pat. No. 9,223,992.

(60) Provisional application No. 61/435,058, filed on Jan. 21, 2011.

(58) Field of Classification Search
USPC .................................................. 726/1
See application file for complete search history.

(56) References Cited

U.S. PATENT DOCUMENTS

| | | | |
|---|---|---|---|
| 7,707,618 B1 | 4/2010 | Cox | |
| 7,747,647 B2 | 6/2010 | Canning et al. | |
| 7,849,502 B1 | 12/2010 | Bloch et al. | |
| 7,921,452 B2 | 4/2011 | Ridlon et al. | |
| 7,941,336 B1 | 5/2011 | Robin-Jan | |
| 8,010,991 B2 | 8/2011 | Sarukkai et al. | |
| 8,024,771 B2 | 9/2011 | Malkin et al. | |
| 8,504,847 B2 | 8/2013 | Resch | |
| 8,601,549 B2 * | 12/2013 | Dickerson | G06F 21/6218 726/26 |
| 8,898,796 B2 * | 11/2014 | Ben-Natan | H04L 63/20 726/1 |
| 8,930,403 B2 | 1/2015 | Rissanen | |
| 8,938,786 B2 | 1/2015 | Cheng | |
| 8,959,569 B2 | 2/2015 | Narayanaswamy | |
| 8,966,576 B2 | 2/2015 | Giambiagi | |
| 9,021,263 B2 | 4/2015 | Resch | |
| 2006/0136407 A1 | 6/2006 | Dettinger et al. | |
| 2006/0253410 A1 | 11/2006 | Nayak et al. | |
| 2007/0078840 A1 | 4/2007 | Stern et al. | |
| 2007/0078874 A1 | 4/2007 | Stern et al. | |
| 2007/0143851 A1 | 6/2007 | Nicodemus et al. | |
| 2008/0016033 A1 | 1/2008 | Forstmann et al. | |
| 2009/0205018 A1 * | 8/2009 | Ferraiolo | G06F 21/6218 726/1 |
| 2009/0240675 A1 * | 9/2009 | Asai | G06F 17/3066 |
| 2009/0265780 A1 | 10/2009 | Korkus et al. | |
| 2010/0042973 A1 * | 2/2010 | Anderson | G06F 8/72 717/120 |
| 2010/0153695 A1 | 6/2010 | Bussard et al. | |
| 2010/0332601 A1 | 12/2010 | Walter et al. | |
| 2011/0276604 A1 | 11/2011 | Horn et al. | |
| 2012/0017260 A1 | 1/2012 | Narain et al. | |

FOREIGN PATENT DOCUMENTS

| | | |
|---|---|---|
| WO | WO 2010/128926 A1 | 11/2010 |
| WO | WO 2010/151493 A2 | 12/2010 |

OTHER PUBLICATIONS

International Search Report (PCT/ISA/210) dated Apr. 17, 2012, by the Swedish Patent Office as the International Searching Authority for International Application No. PCT/SE2011/50955.
Extended European Search Report issued by the European Patent Office dated May 2, 2013, in the corresponding European Patent Application No. 11853144.1 (7 pages).
Supplementary European Search Report issued by the European Patent Office dated Apr. 23, 2013, in the corresponding European Patent Application No. 11853144 ( 4 pages).
Graham Hughes et al., Automated verification of access control policies using a SAT solver, International Journal on Software Tools for Technology Transfer, Springer, XP019635354, vol. 10, No. 6, Oct. 21, 2008 (18 pages).
Carsten Binnig et al., Reverse Query Processing URL: http://archive.systems.ethz.ch/www/dbis.ethz.ch/research/piblications/rqp.pdf, XP055056715, Apr. 20, 2007 (48 pages).
Jonas Sandberg, Administrative Queries in XACML—feasibility of partial-query evaluation, KTH Computer Science and Communication, Swedish Institute of Computer System Science, Dec. 2006 (129 pages).
Hai-bo, Shen; Fan, Hong. An Attribute-Based Access Control Model for Web Services, PDCAT '06. Pub. Date: 2006. Relevant pp. 74-79. http://ieeexplore.ieee.org/stamp/stamp.jsp?tp=&arnumber=4032153.
Bobba, Rakesh; Fatemieh, Omid; Khan, Fariba; Gunter, Carl A.; Khurana, Himanshu. Using Attribute-Based Access Control to Enable Attribute-Based Messaging. ACSAS '06. Pub. Date: 2006. Relevant pp. 403-413. http://ieeesplore.ieee.org/stamp/stamp.jsp?tp=&arnumber=4041185.
Yuan, Eric; Tong, Jin. Attributed Based Access Control (ABAC) for Web Services. Proceedings, 2005 IEEE International Conference on Web Services. ICWS 2005. Pub Date: 2005 http://ieeexplore.ieee.org/stamp/stamp.jsp?tp=&arnumber=1530847.
Zhao, Tiezhu; Dong, Shoubin. A Trust Aware Grid Access Control Architecture Based on ABAC. IEEE Fifth International Conference on Networking, Architecture and Storage (NAS). Pub. Date: 2010, Relevant pp. 109-115. http://ieeexplore.ieee.org/stamp/stamp.jsp?tp=&arnumber=5577281.
International Search Report (PCT/ISA/201/SE) dated Aug. 15, 2011 by the Swedish Patent Office for Application No. ITS/SE10/00420.
Extended Search Report dated Jun. 30, 2015, by the European Patent Office, in corresponding European Patent Application No. 15164634.6 (9 pages).
Lingyu Wang; A Logic-based Framework for Attribute based Access Control; ACM; Oct. 29, 2004; p. 45-55.
Giambiagi, Pablo. "Challenges of ABAC: Access Reviews—Part 1", Axiomatics. Axiomatics Blog, Oct. 9, 2013, Web.
Giambiagi, Pablo. "Challenges of ABAC: Access Reviews—Part 2", Axiomatics. Axiomatics Blog, Oct. 23, 2013, Web.
Kumar, Saravana, "Blimey! What's Axiomatics Reverse Query?" Axiomatics. Axiomatics Blog, Dec. 4, 2013, Web.
Office Action (Communication pursuant to Article 94(3) EPC) dated Jul. 18, 2018, by the European Patent Office in corresponding European Application No. 15 164 634.6-1218, 4 pages.

* cited by examiner

SYSTEM AND METHOD FOR EVALUATING A REVERSE QUERY

CROSS REFERENCE TO RELATED APPLICATIONS

This application is a continuation of U.S. application Ser. No. 14/748,903, filed on Jun. 24, 2015, which is a continuation-in-part application of U.S. application Ser. No. 13/695,880, filed Nov. 2, 2012, now U.S. Pat. No. 9,223,992, which is the National Stage of International Application No. PCT/SE2011/050955, filed Jul. 19, 2011, which claims benefit of U.S. Provisional Application No. 61/435,058, filed Jan. 21, 2011, which claims priority to Swedish Application No. 1051394-3, filed Dec. 30, 2010. The entire contents of each of U.S. application Ser. No. 14/708,903, U.S. application Ser. No. 13/695,880, International Application No. PCT/SE2011/050955, and Swedish Application No. 1051394-3 are hereby incorporated by reference in their entireties.

FIELD OF THE INVENTION

The invention disclosed herein generally relates to the field of access control (AC), particularly access control to resources in computer systems or computer-aided access control to other types of resources. More precisely, the invention provides improved devices and methods for evaluating a policy for a reverse query, which returns such access requests that evaluate to a given decision.

BACKGROUND OF THE INVENTION

An attribute-based AC (ABAC) policy defines access control permissions based on the attributes of the subject, of the resource, and of the action that the subject is to perform on the resource (e.g., read, write). When the policy is enforced in a computer system or computer network, it controls access to entities in the system or network and thereby influences their state of operation. A resource may be, inter alia, a portion of a personal storage quota, a business unit storage quota, an information retrieval system, a (portion of a) database, an online service, a protected webpage or a physical device.

There currently exist general-purpose AC languages that have the richness to express fine-grained conditions and conditions which depend on external data. One particular example of an AC language is the eXtensible Access Control Markup Language (XACML) which is the subject of standardization work in a Technical Committee within the Organization for the Advancement of Structured Information Standards (see http://www.oasis-open.org). A policy encoded with XACML consists of functional expressions in attribute values, and the return value (decision) of the policy is one of Permit, Deny, Not Applicable, or Indeterminate. An XACML policy can apply to many different situations, that is, different subjects, resources, actions and environments and may give different results for different combinations of these. The XACML specification defines how a policy is evaluated for a request (or access request), particularly what policy attributes are to be evaluated or, at least, which values are required to exist for a successful evaluation to result. Key characteristics of this evaluation process are that the access request (the query against the policy) must describe the attempted access to a protected resource fully. In practice, it may be that the request is constructed in multiple stages by different components, so that a PEP (Policy Enforcement Point) provides only some initial attribute values and a PDP (Policy Decision Point) or other components can dynamically fetch more attribute values from remote sources as they are needed. Rules in an ABAC policy may be nested in a conditional fashion, so that attribute values—both those provided initially in the access request and those fetched from remote sources—will influence what further rules are to be applied. Based on a policy or policy set (unless otherwise indicated, these terms are used interchangeably herein) that covers a broad range of resources and subjects and a given request, it is often possible to obtain a decision by evaluating only a fraction of all functional expressions in the policy. Conversely, it cannot always be ascertained prima facie whether a request contains enough attribute values to allow a successful policy evaluation.

A reverse query works in the opposite direction. It defines an expected decision and constraints over the set of possible access requests, and is resolved by finding the set of access requests that (a) fulfill all the constraints, and (b) evaluate to the expected decision. Reverse queries have many uses. For instance, they could be used to determine the list of resources that a subject may access, or the list of subjects that may access a resource. Furthermore, many types of policy analyses can be built using reverse queries (e.g., Segregation of Duty validation).

The semantics of an XACML policy P may be given as a function $f_p$ mapping a request to a decision:

$$f_p: \text{Request} \rightarrow \text{Decision}$$

In many situations, however, it is necessary to evaluate the inverse of the policy function, $$(f_p)^{-1}: \text{Decision} \rightarrow \text{Set(Request)}$$

Given a decision d, $(f_p)^{-1}(d)$ is the set of all requests that evaluate to d. For example, $(f_p)^{-1}(\text{PERMIT})$ is the set of all requests that are permitted by the policy P. Note that $(f_p)^{-1}$ is multi-valued in general, and may be regarded as a mapping from a decision value (Permit, Deny, etc.) to a set of requests.

In many important applications, there is a priori a set R of interesting requests. For instance, to determine all the users that may "read" a certain file "F", only requests that identify the action as "read" and the resource as "file F" are of interest. In other words, what needs to be computed is actually the intersection of $(f_p)^{-1}(d)$ with R, $$(f_p)^{-1}(d) \cap R.$$

These concepts may be summarized by the following definitions.

Definition (Reverse Query)

A reverse query is a triple <P, d, R> where P is a policy, d is a decision and R is a set of requests.

Definition (Reverse Query Evaluation)

A reverse query <P, d, R> is evaluated by computing $(f_p)^{-1}(d) \cap R$, where $f_p$ is the semantic function associated to policy P.

The evaluation of a reverse query is in general much more demanding, in terms of computing resources, in particular, time, than evaluating a request against a policy. If the set of requests of interest, $R = \{r_1, \ldots, r_n\}$, contains a relatively small number of requests then the reverse query <P, d, R> may be effectively evaluated by computing $$f_p(r_1), \ldots, f_p(r_n)$$

and picking only those requests which evaluate to d. That is, a reverse query can be evaluated by sending each request of interest to the PDP (loaded with the policy P) and then comparing the returned decision with the expected decision d.

If the set R is large, however, the method described above becomes impracticable, particularly in situations where the reverse query needs to be evaluated in real-time, e.g., in the context of an interactive system where a user would be waiting in real time for the result of such evaluation.

SUMMARY OF THE INVENTION

It is in view of the above mentioned problems that the present invention has been made.

A method for real-time evaluation of a reverse query to an attribute-based access control policy, ABAC policy, (P) which is enforced to control access to one or more resources in a computer network, executes on a system comprising a processing means, preferably a computer connected to a data network. In accordance with a first aspect of the invention, the method comprises the steps of:

i) receiving a reverse query indicating a given decision (d), which is one of permit access and deny access, and a set (R) of admissible access requests, each of which comprises one or more attributes appearing in the ABAC policy and explicit values assigned to these;

ii) extracting attributes to which all access requests in the set (R) assign identical values;

iii) reducing the ABAC policy at least by substituting values for the extracted attributes;

iv) caching the policy after said reducing as a simplified policy (P');

v) translating the cached simplified policy (P') and the given decision (d) into a satisfiable logic proposition in Boolean variables ($v_i$, i=1, 2, . . . );

vi) deriving all variable assignments ($c_j=[v_1=x_{j1}, v_2=x_{j2}, \ldots]$, j=1, 2, . . . ) satisfying the logic proposition; and vii) extracting, based on the variable assignments thus derived, all access requests from the set (R) for which the ABAC policy (P) yields the given decision (d) (referred to below as "valid requests").

The method alleviates the problems associated with the prior art, since inter alia the reduction of the ABAC policy and the caching of the intermediate result (simplified policy P') for later use considerably reduces the computational load on the processing means.

In a second aspect, the invention provides a system operable to evaluate a reverse query, defining an expected decision, and a subset of a set of admissible requests, over a policy in real time. The system comprises a first storing means operable to store policies. The system also comprises a partial request generation means operable to construct a partial request from the subset of the set of possible requests (cf. step ii). Furthermore, the system also comprises a policy decision means connected to the partial request generation means, and to the first storing means and operable to partially evaluate the policy over the partial request, resulting in a simplified policy (cf. steps iii, iv). The system also comprises a translation means connected to the policy decision means and operable to translate the simplified policy, the subset of the set of possible requests, and the expected decision into a propositional logic formula (cf. step v). Furthermore, the system also comprises an analyzing means connected to the translation means and operable to analyze the propositional logic formula in order to determine a sequence of one or more conditions over requests (cf. step vi). The conditions in the sequence are sufficient in the sense that each corresponds to a variable assignment that satisfies the logic proposition. The order of the conditions in the sequence is not important. The system also comprises a conversion means connected to the analyzing means, and operable to convert the sequence of conditions to a set of valid requests contained in the subset, and evaluate to the expected decision (cf. step vii).

The main advantage with this system is that it can evaluate a reverse query in real time. A further advantage with this system is that it can make the evaluation of a reverse query in real time even if the subset of requests contains a large number of requests.

In example embodiments, the sequence of conditions that correspond to variable assignments satisfying the logic proposition may be output without being processed any further, or after a straightforward adaptation to a suitable presentation format.

Alternatively, the sequence of conditions may be converted back into at least one comparison between an attribute and a fixed value. A comparison may indicate equality between an attribute and a fixed value. Such a conversion may return one or more of the following:

a single comparison, such as document-id=123;

an enumeration of comparisons, such as document-id=123, document-id=124, document-id=127; or a constraint characterizing an set of access requests abstractly, such as document-location=SE.

Because the sequence of conditions satisfies the logic proposition, which is in turn a translation of the simplified policy, it may be expected that each comparison is in agreement with the subset of access requests initially discussed.

Further alternatively, the sequence of conditions may be converted back into a set of valid access requests. The valid access requests may be enumerated explicitly. Because the sequence of conditions satisfies the logic proposition, which is in turn a translation of the simplified policy, it may be expected that each valid access request thus obtained forms part of the subset of access request initially discussed.

Step ii in the method may be performed by (and corresponding modules in the system may be adapted for) studying each of the attributes appearing in the requests in the set (R) to discover whether equal or different values are assigned to them. Attributes with equal values in all requests are extracted. An attribute to which some requests assign values and some do not is preferably not extracted. Step ii may be refined further by forming subsets within the set (R), wherein a first group of attributes has identical values in a first subset, a second group of attributes—possibly overlapping with the first group—has identical values in a second subset, and so forth. The reduction will then lead to a corresponding number of simplified policies, so that the method bifurcates into several branches, the results of which are gathered to form the final result.

In step iv, the reduced policy is cached and forms a simplified policy. Since the simplified policy can be represented as a smaller set of processing instructions (code), it is in general more economical to evaluate. As far as the XACML context is concerned, it is noted that the simplified policy may be represented in the same form as the original policy. However, the simplified policy may in some cases require a richer representation than standard XACML, possibly including a number of new quasi-error states stemming from the fact that some attributes have not yet been evaluated (substituted). For instance, a situation may arise in which a rule cannot be evaluated for lack of target or lack of values assumed by the attributes appearing in a condition in the rule. The simplified policy may then contain an indication that the rule is indeterminate, that is, temporarily overriding the standard evaluation rules, which may specify for this situation that an evaluation error is to be signaled. This is useful since it may turn out, when combining algorithms in the policy are applied, that the sub-tree in which this rule is located is inconsequential to the policy evaluation, so that this sub-tree may be eliminated from the simplified policy. It is noted that if the simplified policy is not represented in standard XACML, evaluation engines adapted for standard XACML may need to be modified to evaluate a simplified policy.

(The concept of a simplified policy and the technique of partial evaluation have been described in more detail in the applicant's earlier applications. Using the terminology of these earlier applications, the initial request may be regarded as a partial request, and the step of reducing may be regarded as a partial evaluation of the policy.)

Step iv may be further refined by evaluating attributes, for which the values to be substituted are found using implicit references defined by values given in a request together with the structure of the policy. For instance, the nationality of a subject may be retrievable from a database using the name of the subject as a key.

Step vi may be performed by means of a SAT solver, i.e., a functional entity implemented in hardware and/or software and configured to input a satisfiable logic expression and to output, in response thereto, a solution (or a variable assignment, or a set of values of variables in the expression) for which the logic expression evaluates to true. Many SAT solvers are known in the art and available from commercial or non-commercial providers. The form in which the logical expression is to be input may vary between different SAT solvers, and this is preferably taken into account when step v is implemented, so that compatibility can be ensured. In general, an ABAC policy encoded in one of the customary or standardized languages is not compatible. Some SAT solvers are configured to return one solution even though the logic expression may evaluate true for several variable assignments. It is desirable in step vi to exhaust the set of solutions; this may be achieved invoking the SAT solver repeated times, wherein a condition excluding the previous solution is added to the logical expression before a new repetition is initiated. As SAT solvers are typically highly specialized for the task of finding a variable assignment satisfying the expression, step vi can be completed very efficiently.

Alternatively, step vi is carried out using techniques based on the theory of binary decision diagrams (BDDs) and Reduced-Order BDDs (ROBDDs), as outlined in B. Akers, "Binary Decision Diagrams", *IEEE Trans. Comp.*, vol. C-27, no. 6 (1978), p. 509 and R. E. Bryant, "Graph-based algorithms for Boolean function manipulation", *IEEE Trans. Comp.*, vol. C-35, no. 8 (1986), p. 677. A plurality of references in this area describe algorithms for translating a logic expression into a BDD or ROBDD, and there exist further algorithms for deriving exhaustive sets of solutions. These solutions may then be converted back into a form that will allow those access requests in the set (R) for which the policy yields the given decision to be extracted. Implementations of such algorithms as libraries of computer-executable code can be retrieved from commercial or non-commercial sources. For example, the library JavaBDD can be retrieved from http://sourceforge.net, http://sourceforge.net/projects/javabdd, http://javabdd.sourceforge.net/or archived versions of these pages. A further BDD package is BuDDy, downloadable from http://buddy.sourceforge.net. Compared with the SAT-solver approach to carrying out step vi, the translation (step v) may require a slightly greater effort if BDDs are used; step vi may on the other hand execute more efficiently.

As the person skilled in computer science will realize when studying this disclosure, there are further options for implementing step vi. Since generally a faster evaluation happens at the price of a more involved translation process, and conversely, the selection of a particular implementation may depend on facts related to the intended application or use, including the complexity of the concerned ABAC policy and its degree of nesting.

A further advantage in this context is achieved if the system also comprises a policy information means which is connected to the policy decision means, and the conversion means and is operable to handle a set of attributes.

Furthermore, it is an advantage in this context if the partial request generation means also is operable to examine the subset of possible requests in order to determine (I) the set (D) of attributes that are associated with exactly the same set of values in all requests of the subset (R); (II) the set (A) of attributes that are absent in all requests of the subset (R); and (III) the set (U) of all other attributes not included in any of the sets (D or A) of attributes.

A further advantage in this context is achieved if the partial request generation means also is operable to, by using the sets (D, A and U) of attributes, define the partial request which (IV) associates to each attribute in the set (D) of attributes, the exact set of values associated to it by any request in the subset (R); (V) marks all attributes in the set (A) as not present; and (VI) leaves all attributes in the set (U) undefined.

Furthermore, with particular reference to step v, it is an advantage in this context if the translation means also is operable to represent the simplified policy with a tree structure, and to, whenever a sub-tree represents a Boolean expression that compares an attribute with a fixed value, replace the whole sub-tree by a variable.

A further advantage in the context of step v is achieved if the translation means also is operable to, from each condition node and downwards, whenever a sub-tree represents a Boolean expression, but at least one of its children evaluates to a non-Boolean value, replace the whole sub-tree by a variable.

Furthermore, it is an advantage in the context of step v if the system also comprises a second storing means connected to the translation means, and to the conversion means, and operable to store the correlation between each variable and the sub-tree it has replaced.

A further advantage in the context of step v is achieved if the variables can hold a value from the set, representing the values true, false and indeterminate. This may be achieved by substituting two associated Boolean variables for each such variable capable of assuming three values. As such, (1,1) may signify a true state, (0,0) may signify a false state, and (0,1) may signify that the variable is indeterminate. Similarly, for a tree (representing a policy or policy set) or sub-tree (representing a subordinate policy or policy set), one may substitute two associated Boolean values representing (1,0)—permit, (0,0)—deny, (1,1)—indeterminate, (0,1)—not applicable.

Furthermore, it is an advantage in this context if the conversion means also is operable to, given a request r, determine if it fulfills any condition, and if it does, then r is added to the set R of valid requests.

The above mentioned problems are also solved with a method for evaluating a reverse query, defining an expected decision, and a subset (R) of a set of possible requests, over a policy (P) in real-time. The method is performed with the aid of a system. The method comprises the steps:

with the aid of a first storing means, comprised in the system, to store policies;

with the aid of a partial request generation means, comprised in the system, to construct a partial request from the subset (R) of the set of possible requests;

with the aid of a policy decision means connected to the partial request generation means, and to the first storing means, to partially evaluate the policy over the partial request resulting in a simplified policy;

with the aid of a translation means, connected to the policy decision means, to translate the simplified policy, the subset of the set of possible requests, and the expected decision into a propositional logic formula;

with the aid of an analyzing means connected to the translation means, to analyze the propositional logic formula in order to determine a sequence of conditions over requests; and with the aid of a conversion means, connected to the analyzing means, to convert the sequence of conditions to a set of valid requests contained in the subset (R), and evaluate to the expected decision.

The main advantage with this method is that it can evaluate a reverse query in real-time. A further advantage with this method is that it can make the evaluation of a reverse query in real-time even if the subset of requests contains a large number of requests.

A further advantage in this context is achieved if the method also comprises the step:

with the aid of a policy information means, comprised in the system, and connected to the policy decision means, and the conversion means, to handle a set of attributes.

Furthermore, it is an advantage in this context if the method also comprises the steps:

with the aid of the partial request generation means, to examine the subset (R) of possible request in order to determine (I) the set (D) of attributes that are associated with exactly the same set of values in all requests of the subset (R);

(II) the set (A) of attributes that are absent in all requests of the subset (R); and (III) the set (U) of all other attributes not included in any of the sets (D or A) of attributes.

A further advantage in this context is achieved if the method also comprises the steps:

with the aid of the partial request generation means, by using the sets (D, A and U) of attributes, to define the partial request, which (IV) associates to each attribute in the set (D) of attributes, the exact set of values associated to it by any request in the subset (R);

(V) marks all attributes in the set (A) as not present; and (VI) leaves all attributes in the set (U) undefined.

Furthermore, it is an advantage in this context if the method also comprises the steps:

with the aid of the translation means, to represent the simplified policy with a tree structure;

whenever a sub-tree represents a Boolean expression that compares an attribute with a fixed value; and to replace the whole sub-tree by a variable.

A further advantage in this context is achieved if the method also comprises the step:

with the aid of the translation means, from each condition node and downwards, whenever a sub-tree represents a Boolean expression, but at least one of its children evaluates to a non-Boolean value, to replace the whole sub-tree by a variable.

Furthermore, it is an advantage in this context if the method also comprises the step:

with the aid of a second storing means, comprised in the system, and connected to the translation means, to store a correlation between each variable and the sub-tree it has replaced.

A further advantage in this context is achieved if the variables can hold a value from the set, representing the values true, false and indeterminate.

Furthermore, it is an advantage in this context if the method also comprises the steps:

with the aid of the conversion means, given a request r∈R, to determine if it fulfills any condition; and if it does, to add r to the set of valid requests.

The above mentioned problems are also solved with at least one computer program product. The at least one computer program product is/are directly loadable into the internal memory of at least one digital computer, and comprises software code portions for performing the steps of the method according to the present invention when the at least one product is/are run on the at least one computer.

The main advantage with this computer program product is that it can evaluate a reverse query in real-time. A further advantage with this product is that it can make the evaluation of a reverse query in real-time even if the subset of requests contains a large number of requests.

It will be noted that the term "comprises/comprising" as used in this description is intended to denote the presence of a given characteristic, step or component, without excluding the presence of one or more other characteristics, features, integers, steps, components or groups thereof.

BRIEF DESCRIPTION OF THE DRAWINGS

Embodiments of the invention will now be described with a reference to the accompanying drawings, on which.

DETAILED DESCRIPTION OF THE PREFERRED EMBODIMENTS

Figure 1:
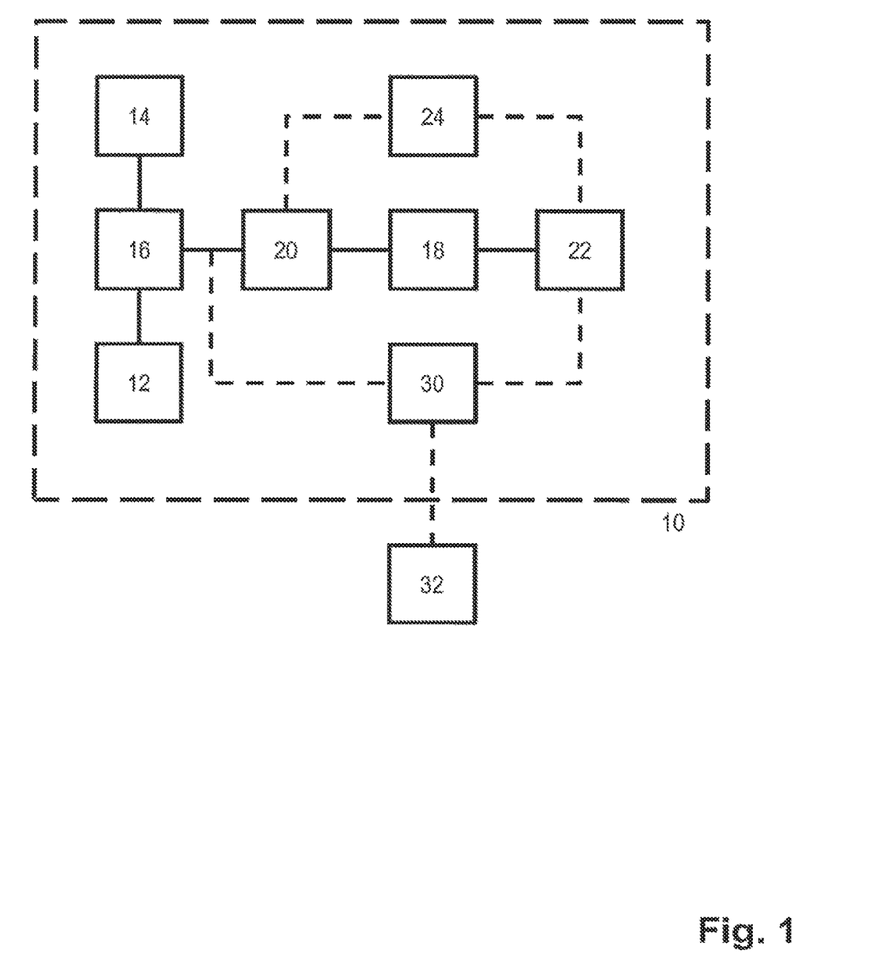
FIG. 1 is a block diagram of a system operable to evaluate a reverse query, defining an expected decision, and a subset of a set of possible requests, over a policy in real-time according to the present invention.

In FIG. 1 there is disclosed a block diagram of a system 10 operable to evaluate a reverse query, defining an expected decision (d), and a subset (R) of a set of possible requests, over a policy (P) in real-time according to the present invention. The system 10 comprises a first storing means 12 operable to store policies. Furthermore, the system 10 also comprises a partial request generation means 14 operable to construct a partial request ($r_{partial}$) from the subset (R) of the set of possible requests. As is apparent in FIG. 1, the system 10 also comprises a policy decision means 16 connected to the partial request generation means 14, and to the first storing means 12, and operable to partially evaluate the policy (P) over the partial request ($r_{partial}$) resulting in a simplified policy (P'). Furthermore, the system 10 also comprises a translation means 20 connected to the policy decision means 16, and operable to translate the simplified policy (P'), the subset (R) of the set of possible requests, and the expected decision (d) into a propositional logic formula (F). The system 10 also comprises an analyzing means 18 connected to the translation means 20, and operable to analyze the propositional logic formula (F) in order to determine a sequence $[c_1, \ldots, c_k]$ of conditions over requests, preferably sufficient conditions. As also is apparent in FIG. 1, the system 10 also comprises a conversion means 22 connected to the analyzing means 18, and operable to convert the sequence $[c_1, \ldots, c_k]$ of conditions to a set of valid requests contained in the subset (R), and evaluate to the expected decision (d).

According to one alternative, the system 10 can also comprise a policy information means 30 operable to handle a set of attributes 32. The policy information means 30 is connected to the policy decision means 16, and to the conversion means 22. These connections are disclosed in FIG. 1 with broken lines, because these elements are not mandatory in the system 10.

According to another alternative, the partial request generation means 14 is also operable to examine the subset (R) of the set of possible requests in order to determine (I) the set (D) of attributes that are associated with exactly the same set of values in all requests of the subset (R); (II) the set (A) of attributes that are absent in all requests of the subset (R); and (III) the set (U) of all other attributes not included in any of the sets (D or A) of attributes.

According to a further alternative, the partial request generation means 14 is also operable to, by using the sets (D, A and U) of attributes, define the partial request ($r_{partial}$), which (IV) associates to each attribute in the set (D) of attributes, the exact set of values associated to it by any request in the subset (R); (V) marks all attributes in the set (A) as not present; and (VI) leaves all attributes in the set (U) undefined.

According to yet another alternative, the translation means 20 is also operable to represent the simplified policy (P') with a tree structure, and to, whenever a sub-tree represents a Boolean expression that compares an attribute with a fixed value, replace the whole sub-tree by a variable ($v_i$).

According to another alternative, the translation means 20 is also operable to, from each condition node and downwards, whenever a sub-tree represents a Boolean expression, but at least one of its children evaluates to a non-Boolean value, replace the whole sub-tree by a variable ($v_i$).

As also is apparent in FIG. 1, the system 10 can also comprise a second storing means 24 operable to store the correlation between each variable ($v_i$) and the sub-tree it has replaced. The second storing means 24 is connected to the translation means 20, and to the conversion means 22. These connections are disclosed in FIG. 1 with a broken line, because these elements are not mandatory in the system 10.

Furthermore, according to another alternative, the variables ($v_i$) can hold a value from the set $\{T, F, \perp\}$, representing the values true, false and indeterminate.

According to yet another alternative, the conversion means 22 is also operable to, given a request $r \in R$, determine if it fulfills any condition $c_i$, and if it does, then r is added to the set of valid requests.

Figure 2:
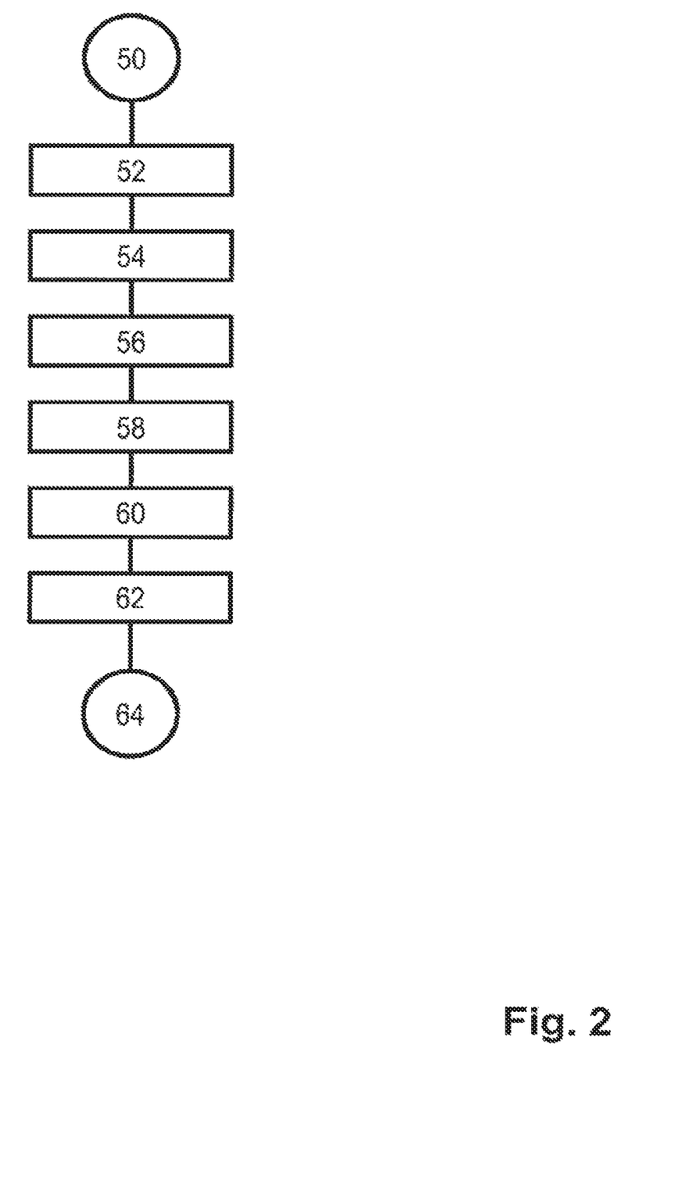
FIG. 2 is a flow chart of a method for evaluating a reverse query, defining an expected decision, and a subset of a set of possible requests, over a policy in real-time according to the present invention.

In FIG. 2 there is disclosed a flow chart of a method for evaluating a reverse query, defining an expected decision (d), and a subset (R) of a set of possible requests, over a policy (P) in real-time according to the present invention. The method is performed with the aid of a system 10 (see FIG. 1). The method begins at block 50. The method continues, at block 52, with the step: with the aid of a first storing means 12, comprised in the system 10, to store policies. Thereafter, the method continues, at block 54, with the step: with the aid of a partial request generation means 14, comprised in the system 10, to construct a partial request ($r_{partial}$) from the subset (R) of the set of possible requests. The method continues, at block 56, with the step: with the aid of a policy decision means 16 connected to the partial request generation means 14, to partially evaluate the policy (P) over the partial request ($r_{partial}$) resulting in a simplified policy (P'). Thereafter, the method continues, at block 58, with the step: with the aid of a translation means 20, connected to the policy decision means 16, to translate the simplified policy (P'), the subset (R) of the set of possible requests, and the expected decision (d) into a propositional logic formula (F). The method continues, at block 60, with the step: with the aid of an analyzing means 18 connected to the translation means 20, to analyze the propositional logic formula (F) in order to determine a sequence $[c_1, \ldots, c_k]$ of conditions over requests. Thereafter, the method continues, at block 62, with the step: with the aid of a conversion means 22, connected to analyzing means 18, to convert the sequence $[c_1, \ldots, c_k]$ of conditions to a set of valid requests contained in the subset (R), and evaluate to the expected decision (d). The method is completed at block 64.

According to one alternative, the method also comprises the step: with the aid of a policy information means 30, comprised in the system 10, and connected to the policy decision means 16, and to the conversion means 22, to handle a set of attributes 32.

According to another alternative, the method also comprises the steps: with the aid of the partial request generation means 14, to examine the subset (R) of possible requests in order to determine (I) the set (D) of attributes that are associated with exactly the same set of values in all requests of the subset (R);

(II) the set (A) of attributes that are absent in all requests of the subset (R); and (III) the set (U) of all other attributes not included in any of the sets (D or A) of attributes.

According to yet another alternative, the method also comprises the steps: with the aid of the partial request generation means 14, by using the sets (D, A and U) of attributes, to define the partial request ($r_{partial}$), which (IV) associates to each attribute in the set (D) of attributes, the exact set of values associated to it by any request in the subset (R);

(V) marks all attributes in the set (A) as not present; and (VI) leaves all attributes in the set (U) undefined.

Furthermore, according to another alternative, the method also comprises the steps:

with the aid of the translation means 20, to represent the simplified policy (P') with a tree structure;

whenever a sub-tree represents a Boolean expression that compares an attribute with a fixed value; and to replace the whole sub-tree by a variable ($v_i$).

According to a further alternative, the method also comprises the step:

with the aid of the translation means 20, from each condition node and downwards, whenever a sub-tree represents a Boolean expression, but at least one of its children evaluates to a non-Boolean value, to replace the whole sub-tree by a variable ($v_i$).

According to another alternative, the method also comprises the step:

with the aid of a second storing means 24, comprised in the system 10, and connected to the translation means 20, and to the conversion means 22 to store a correlation between each variable ($v_i$) and the sub-tree it has replaced.

According to yet another alternative, the variables ($v_i$) can hold a value from the set $\{T, F, \perp\}$, representing the values true, false and indeterminate.

Furthermore, according to another alternative, the method also comprises the steps:

with the aid of the conversion means 22, given a request $r \in R$, to determine if it fulfills any condition $c_i$; and if it does, to add r to the set of valid requests.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Figure 3:
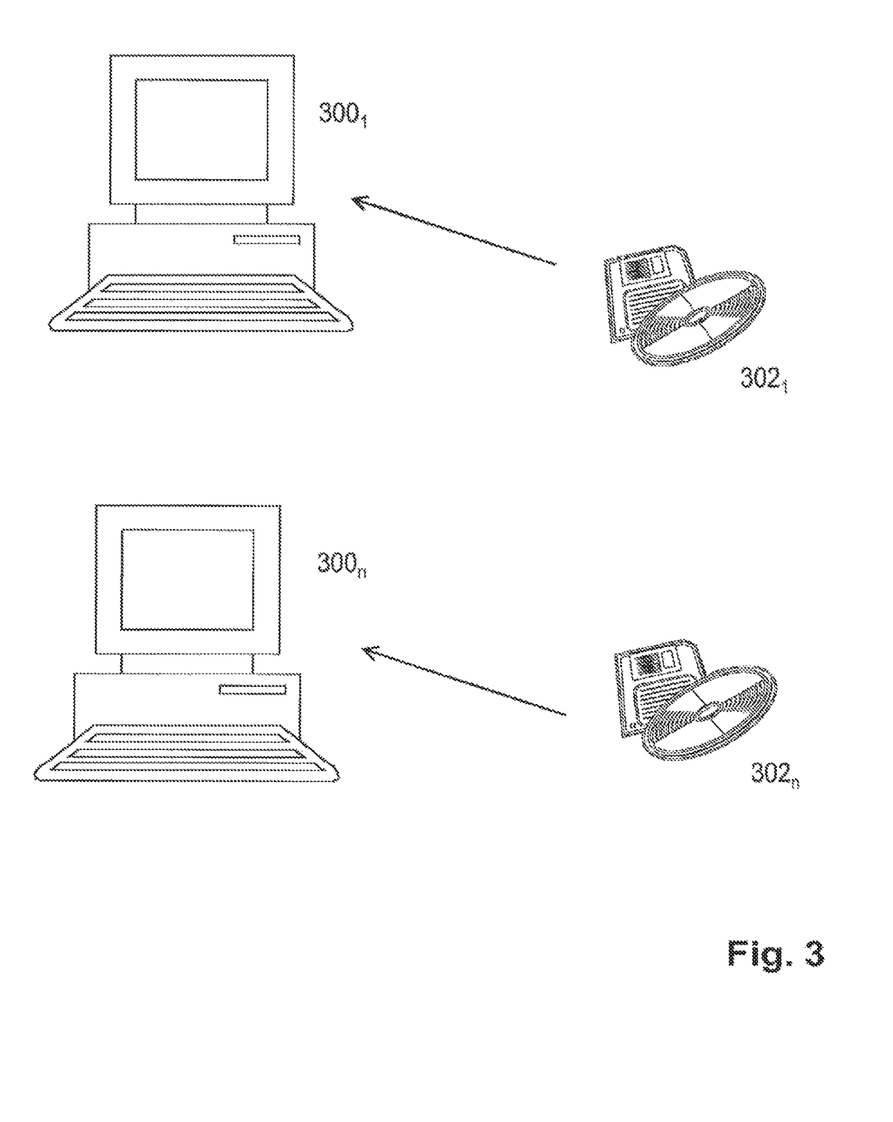
FIG. 3 schematically shows a number of computer program products according to the present invention.

In FIG. 3, some computer program products $302_1, \ldots, 302_n$ according to the present invention are schematically shown. In FIG. 3, n different digital computers $300_1, \ldots, 300_n$ are shown, where n is an integer. In FIG. 3, n different computer program products $302_1, \ldots, 302_n$ are shown, here shown in the form of floppy/compact discs. The different computer program products $302_1, \ldots, 302_n$ are directly loadable into the internal memory of the n different computers $300_1, \ldots, 300_n$. Each computer program product $302_1; \ldots; 302_n$ comprises software code portions for performing all the steps according to FIG. 2, when the product/products $302_1, \ldots, 302_n$ is/are run on the computers $300_1, \ldots, 300_n$. The computer program products $302_1, \ldots, 302_n$ may, for instance, be in the form of diskettes, RAM discs, magnetic tapes, magneto-optical discs or some other suitable products.

Figure 4:
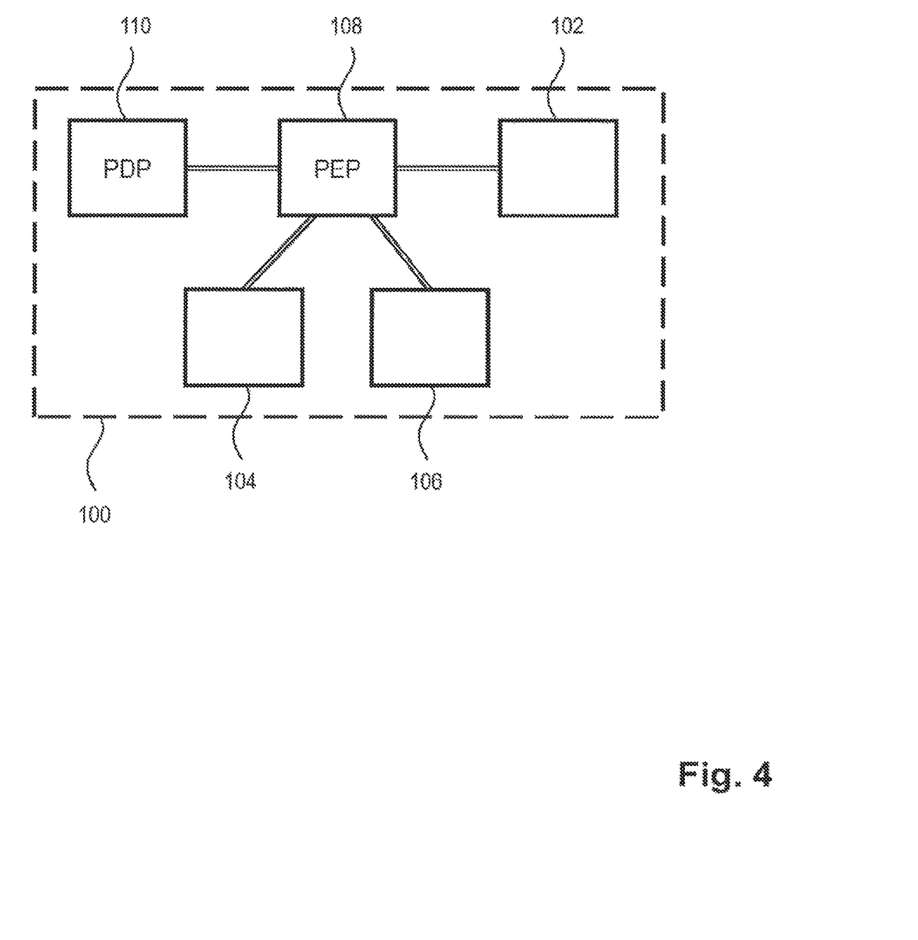
FIG. 4 illustrates an exemplifying AC policy architecture.
Figure 5:
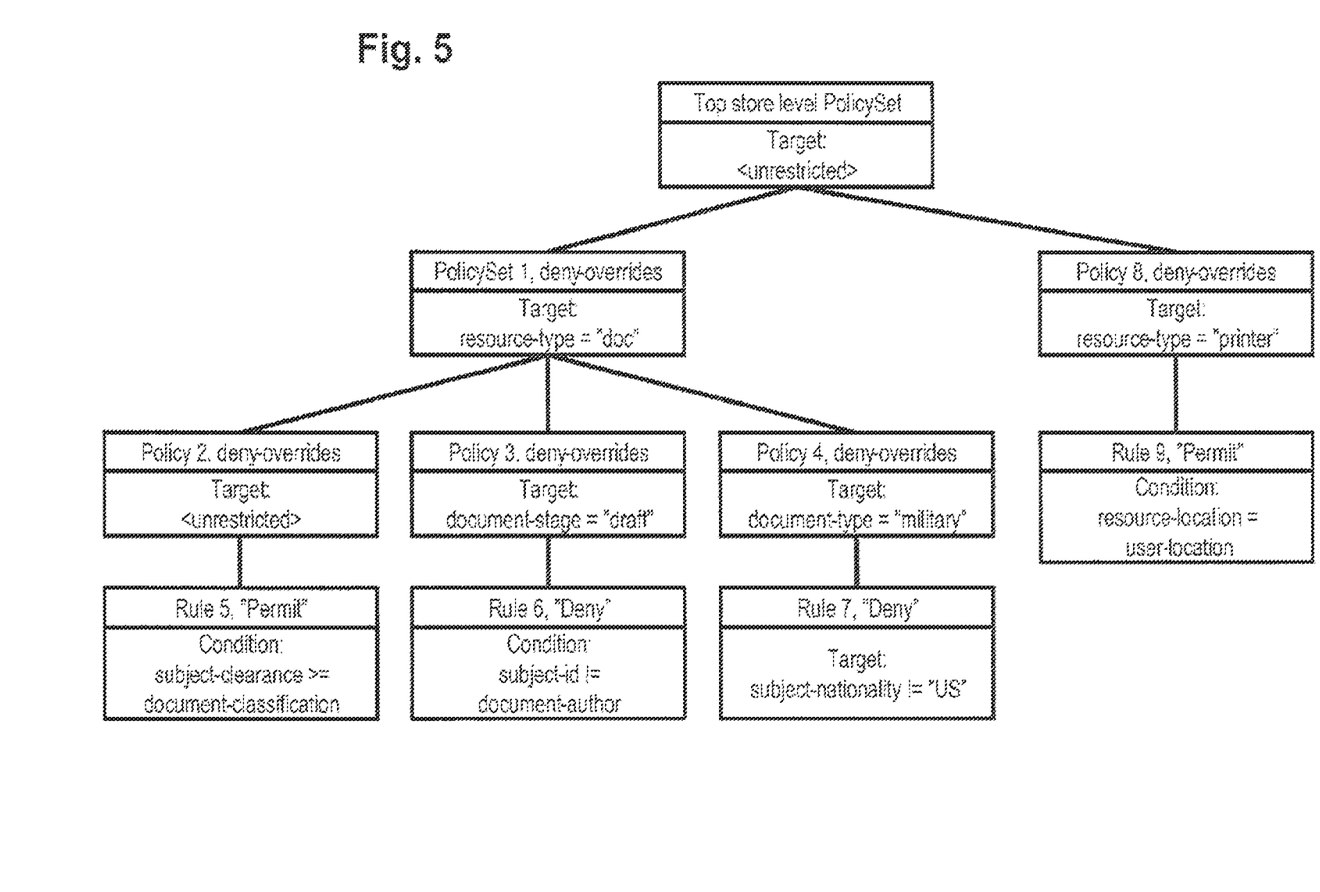
FIG. 5 is a tree representation of an ABAC policy set.

FIG. 4 is a generalized block diagram of the XACML architecture 100, although simplified, according to the prior art. As stated before, XACML is an access control policy language. An attempt to access a resource 102 is represented as a "Request", which lists attributes of the subject 104, the resource 102, the action and the environment 106. An attribute is an identifier, a data type and a value. It can also be described as a variable with a name (the identifier), a data type and a value. Most facts relating to the subject 104, the resource 102, the action and the environment 106 can be described in terms of attributes.

The request is constructed by a PEP 108. The purpose of a PEP 108 is to guard access to a resource 102 and only let authorized users through. The PEP 108 itself does not know who is authorized, but it submits the request to a PDP 110, which contain policies governing what requests are to be permitted or denied, respectively. The PDP 110 evaluates the policies and returns a permit/deny response to the PEP 108. The PEP 108 then either lets the access proceed or stops it. As already noted, the PEP (Policy Enforcement Point) may provide only some initial attribute values and the PDP (Policy Decision Point) or other components may dynamically fetch more values from remote sources as they are needed. If all necessary values cannot be retrieved, the policy evaluation may return an output to the effect that the policy is indeterminate or not applicable in the circumstances, or an error message.

A purpose of this architecture is to establish separation of concerns, that is, to differentiate between policy decision making and policy enforcement. Enforcement is by its nature specific to a particular resource 102, while a decision engine can be made general-purpose and reusable.

In general, policies can be nested to form a policy set, as may be visualized in a tree form of the type shown in FIG. 2. The combination of different policies is governed by combining algorithms, which define what policy takes precedence over another policy. The node "PolicySet 1" in FIG. 2 is of the "deny-overrides" type, so that a "Deny" decision from one of the three sub-trees will take precedence; hence, the "deny-overrides" operator acts as logical AND. In contrast, decisions produced by sub-trees which connect at a "permit-overrides" node are subject to logical OR.

At the lowest level of the tree shown in FIG. 2, there are rules including effects (e.g., "Deny") and underlying conditions formulated in terms of attributes, for instance, "subject-nationality !='US'", where "subject-nationality" is a subject attribute and "US" is a constant. At several nodes above the lowest level, there are conditions labelled "Target:", which indicate the requests for which the sub-tree having its root at that node is applicable. For example, if the condition "document-stage='draft'" evaluates to "false", then Policy 3, including Rule 6, is not applicable and can be excluded from evaluation.

Currently contemplated uses of the reverse evaluation techniques discussed in this disclosure include the task of finding answers to open-ended access-related questions typically asked by system administrators and support staff. Example questions are "What user may read file F?", "What actions is user U allowed to perform in respect of file F?" and "Does any network printer allow remotely logged in users to print documents?" Automated tools for finding such answers with respect to an ABAC policy in force may not only save time and eliminate computational errors. Such tools, particularly if the ABAC policy is expressed in a dedicated access control language (e.g., XACML) that may be properly understood and analyzed only after an amount of training, may additionally have the benefit of broadening the circle of qualified personnel.

The reverse evaluation techniques according to this disclosure may be used to support access review, a process in which an organization asks decision makers on a regular basis to review user accounts and their permissions to ensure that access rights that are no longer required have been duly removed. The decision maker carrying out an access review may be a business manager, who typically is not technically qualified but is well acquainted with the requirements of the organization and the people (s)he manages and therefore capable of discovering factual errors, inconsistencies or authorizations granted by mistake. As an adaptation to the purpose of access review, the present reverse evaluation techniques may be limited to two main types of queries: (1) show all conditionals which apply for a specific, identified user, and (2) show all conditionals which apply for a specific, identified resources (optionally, in combination with a specific, identified action). The resulting conditionals may be shown in a human-readable language, such as the applicant's ALFA™ (Axiomatics Language For Authorization), which may be understood by a person with limited or no technological training.

To further facilitate use of the automated access review tool, queries according to the two main types may be predefined as query templates by a technically qualified user or, as the case may be, by an access control specialist versed in the dedicated access control language in which the applicable ABAC policy is set forth. A query template may include the following data: a short name or title of the template; a human-readable description; (optional) assorted metadata to facilitate the user experience; an input category of the query being (a) a subject, or (b) a resource, or (c) a combination of a resource and an action; attribute values identifying an object in the input category of the user; values of any other required attributes that must be provided in the query. The number of available templates may be varied in accordance with the requirements of a specific use case. In particular, in cases where a PEP uses different sets of attributes for different types of resource, it may be necessary to predefine one query for each type of resource to render each query well-defined. After a user has filled in values of the attributes in the template (this task need not require technical training), a reverse query is generated from the template and is evaluated against the ABAC policy. The evaluation results (conditionals) may be presented in a report to the user, possibly after conversion into a technically less demanding language, such as ALFA™.

Debugging access is an envisioned further use of the reverse query technology. More precisely, support staff now and then encounter situations where a user or group of users are not able to complete their duties and it is hypothesized they have not been granted sufficient authorizations to perform certain actions in respect of a given resource. Troubleshooting in similar situations may be more efficient—and may be carried out by a wider group of staff—if automated tools are available in addition to a manual review of the code specifying the applicable ABAC policy and the attribute values associated with the user or user group. By executing a reverse query in respect of the ABAC policy, the attributes of the resource and the user, and Permit as the given decision, support staff may gain knowledge of the permissions (in terms of further attribute values) required for the user to be granted access to the resource. Based on the information that the reverse query returns, support staff may then focus their subsequent efforts on the most promising options to solve the problem.

Further Embodiments

1. A system (10) operable to evaluate a reverse query, defining an expected decision (d), and a subset (R) of a set of possible requests, over a policy (P) in real-time, said system (10) comprising a first storing means (12) operable to store policies, wherein said system (10) also comprises a partial request generation means (14) operable to construct a partial request ($r_{partial}$) from said subset (R) of said set of possible requests, a policy decision means (16) connected to said partial request generation means (14), and to the first storing means (12), and operable to partially evaluate said policy (P) over said partial request ($r_{partial}$) resulting in a simplified policy (P'), a translation means (20) connected to said policy decision means (16), and operable to translate said simplified policy (P'), said subset (R) of said set of possible requests, and said expected decision (d) into a propositional logic formula (F), an analyzing means (18) connected to said translation means (20), and operable to analyze said propositional logic formula (F) in order to determine a sequence $[c_1, \ldots, c_k]$ of conditions over requests, and a conversion means (22) connected to said analyzing means (18), and operable to convert said sequence $[c_1, \ldots, c_k]$ of conditions to a set of valid requests contained in said subset (R), and evaluate to said expected decision (d).

2. A system (10) operable to evaluate a reverse query over a policy (P) in real-time according to embodiment 1, wherein said system (10) also comprises a policy information means (30) connected to said policy decision means (16), and said conversion means (22), and operable to handle a set of attributes (32).

3. A system (10) operable to evaluate a reverse query over a policy (P) in real-time according to embodiment 1 or 2, wherein said partial request generation means (14) also is operable to examine said subset (R) of possible requests in order to determine (I) the set (D) of attributes that are associated with exactly the same set of values in all requests of said subset (R); (II) the set (A) of attributes that are absent in all requests of said subset (R); and (III) the set (U) of all other attributes not included in any of the sets (D or A) of attributes.

4. A system (10) operable to evaluate a reverse query over a policy (P) in real-time according to embodiment 3, wherein said partial request generation means (14) also is operable to, by using said sets (D, A and U) of attributes, define said partial request ($r_{partial}$), which (IV) associates to each attribute in said set (D) of attributes, the exact set of values associated to it by any request in said subset (R); (V) marks all attributes in said set (A) as not present; and (VI) leaves all attributes in said set (U) undefined.

5. A system (10) operable to evaluate a reverse query over a policy (P) in real-time according to any one of embodiments 1-4, wherein said translation means (20) also is operable to represent said simplified policy (P') with a tree structure, and to, whenever a sub-tree represents a Boolean expression that compares an attribute with a fixed value, replace said whole sub-tree by a variable ($v_i$).

6. A system (10) operable to evaluate a reverse query over a policy (P) in real-time according to embodiment 5, wherein said translation means (20) also is operable to, from each condition node and downwards, whenever a sub-tree represents a Boolean expression, but at least one of its children evaluates to a non-Boolean value, replace said whole sub-tree by a variable ($v_i$).

7. A system (10) operable to evaluate a reverse query over a policy (P) in real-time according to embodiment 5, or 6, wherein said system (10) also comprises a second storing means (24) connected to said translation means (20), and to said conversion means (22), and operable to store the correlation between each variable ($v_i$) and said sub-tree it has replaced.

8. A system (10) operable to evaluate a reverse query over a policy (P) in real-time according to embodiment 7, wherein said variables ($v_i$) can hold a value from the set $\{T, F, \perp\}$, representing the values true, false and indeterminate.

9. A system (10) operable to evaluate a reverse query over a policy (P) in real-time according to any one of embodiments 5-8, when dependent on embodiment 5, wherein said conversion means (22) also is operable to, given a request $r \in R$, determine if it fulfills any condition $c_i$, and if it does, then r is added to said set of valid requests.

10. A method for evaluating, with the aid of a system (10), a reverse query, defining an expected decision (d), and a subset (R) of a set of possible requests, over a policy (P) in real-time, said method comprises the steps:

with the aid of a first storing means (12), comprised in said system (10), to store policies;

with the aid of a partial request generation means (14), comprised in said system (10), to construct a partial request ($r_{partial}$) from said subset (R) of said set of possible requests;

with the aid of a policy decision means (16) connected to said partial request generation means (14), and to said first storing means (12), to partially evaluate said policy (P) over said partial request ($r_{partial}$) resulting in a simplified policy (P');

with the aid of a translation means (20), connected to said policy decision means (16), to translate said simplified policy (P'), said subset (R) of said set of possible requests, and said expected decision (d) into a propositional logic formula (F);

with the aid of an analyzing means (18) connected to said translation means (20), to analyze said propositional logic formula (F) in order to determine a sequence $[c_1, \ldots, c_k]$ of conditions over requests; and with the aid of a conversion means (22), connected to said analyzing means (18), to convert said sequence $[c_1, \ldots, c_k]$ of conditions to a set of valid requests contained in said subset (R), and evaluate to said expected decision (d).

11. A method for evaluating a reverse query over a policy (P) in real-time according to embodiment 10, wherein said method also comprises the step:

with the aid of a policy information means (30), comprised in said system (10), and connected to said policy decision means (16), and said conversion means (22), to handle a set of attributes (32).

12. A method for evaluating a reverse query over a policy (P) in real-time according to embodiment 10 or 11, wherein said method also comprises the steps:

with the aid of said partial request generation means (14), to examine said subset (R) of possible requests in order to determine (I) the set (D) of attributes that are associated with exactly the same set of values in all requests of said subset (R);

(II) the set (A) of attributes that are absent in all requests of said subset (R); and (III) the set (U) of all other attributes not included in any of the sets (D or A) of attributes.

13. A method for evaluating a reverse query over a policy (P) in real-time according to embodiment 12, wherein said method also comprises the steps:

with the aid of said partial request generation means (14), by using said sets (D, A and U) of attributes, to define said partial request ($r_{partial}$), which (IV) associates to each attribute in said set (D) of attributes, the exact set of values associated to it by any request in said subset (R);

(V) marks all attributes in said set (A) as not present; and (VI) leaves all attributes in said set (U) undefined.

14. A method for evaluating a reverse query over a policy (P) in real-time according to any one of embodiments 10-13, wherein said method also comprises the steps:

with the aid of said translation means (20), to represent said simplified policy (P') with a tree structure;

whenever a sub-tree represents a Boolean expression that compares an attribute with a fixed value; and to replace said whole sub-tree by a variable ($v_i$).

15. A method for evaluating a reverse query over a policy (P) in real-time according to embodiment 14, wherein said method also comprises the step:

with the aid of said translation means (20), from each condition node and downwards, whenever a sub-tree represents a Boolean expression, but at least one of its children evaluates to a non-Boolean value, to replace said whole sub-tree by a variable ($v_i$).

16. A method for evaluating a reverse query over a policy (P) in real-time according to embodiment 14, or 15, wherein said method also comprises the step:

with the aid of a second storing means (24), comprised in said system (10), and connected to said translation means (20), and to said conversion means (22), to store a correlation between each variable ($v_i$) and said sub-tree it has replaced.

17. A method for evaluating a reverse query over a policy (P) in real-time according to embodiment 16, wherein said variables ($v_i$) can hold a value from the set $\{T, F, \perp\}$, representing the values true, false and indeterminate.

18. A method for evaluating a reverse query over a policy (P) in real-time according to any one of embodiments 14-17, when dependent on embodiment 14, wherein said method also comprises the steps:

with the aid of said conversion means (22), given a request $r \in R$, to determine if it fulfills any condition $c_i$; and if it does, to add r to said set of valid requests.

19. At least one computer program product ($102_1, \ldots, 102_n$) directly loadable into the internal memory of at least one digital computer ($100_1, 100_n$), comprising software code portions for performing the steps of embodiment 10 when said at least one product ($102_1, \ldots, 102_n$) is/are run on said at least one computer ($100_1, \ldots, 100_n$).

Further embodiments of the present invention will become apparent to a person skilled in the art after studying the description above. Even though the present description and drawings disclose embodiments and examples, the invention is not restricted to these specific examples. For instance, the invention can be applied to control access to resources outside the context of computing; as an example, access to the premises in a building can be controlled if suitable identification means (e.g., card readers, biometric sensors, which identify a person as a subject in a guarding system) and actuators (e.g., electrically controllable door locks) are provided and are communicatively connected to a computer system for enforcing the AC policy. Numerous modifications and variations can be made without departing from the scope of the present invention, which is defined by the accompanying claims. Any reference signs appearing in the claims are not to be understood as limiting their scope.

The invention claimed is:

1. A computer-implemented method for real-time evaluation of a reverse query to an attribute-based access control (ABAC) policy (P) comprising functional expressions dependent on attributes, wherein the ABAC policy is evaluable for an access request if the access request assigns a value to at least one of said attributes, wherein an access decision resulting from said evaluation is enforceable to control access to one or more resources in a computer network, said method performed by a processing device and comprising the steps of:
  i) receiving by the processing device a reverse query indicating a given access decision (d), which is one of permit access and deny access, and further indicating a subset (R) of two or more access requests to the ABAC policy, wherein the subset (R) is defined by constraints over the set of possible access requests;
  ii) constructing by the processing device a partial request ($r_{partial}$) from the subset (R) of access requests;
  iii) reducing by the processing device the ABAC policy in accordance with the partial request;
  iv) caching by the processing device the ABAC policy after said reducing, as a simplified policy (P') comprising at least one functional expression dependent on an attribute;
  v) translating by the processing device the cached simplified policy (P') and the given decision (d) into a satisfiable logic proposition in Boolean variables ($v_i$, i=1, 2, . . . ), including replacing, by a Boolean variable, any Boolean expression in the policy representing a comparison of an attribute and a fixed value;
  vi) deriving by the processing device all variable assignments ($c_j=[v_1=x_{j1}, v_2=x_{j2}, \ldots]$, j=1, 2, . . . ) satisfying the logic proposition;
  vii) processing by the processing device the variable assignments satisfying the logic proposition on the basis of a correlation between each Boolean variable and the comparison which it replaces; and
  viii) determining by the processing device, from each variable assignment processed in step vii, a set of potential access requests for which the ABAC policy would evaluate to the given decision (d) and where each request belongs to subset R.

2. The method of claim 1, wherein step ii includes examining the subset (R) of access requests in order to determine:
  a first set (D) of attributes that are associated with exactly the same set of values in all requests of the subset (R);
  a second set (A) of attributes that are absent in all requests of the subset (R); and
  a third set (U) of all other attributes not included in any of the first set (D) of attributes and the second set (A) of attributes.

3. The method of claim 2, wherein step iii includes using the sets (D, A, U) of attributes to generate a partial access request, which:
  assigns, to each attribute in the first set (D) of attributes, the exact set of values associated to it by any request in the subset (R); and
  leaves all attributes in the third set (U) undefined.

4. The method of claim 3, wherein the partial access request further (V) marks all attributes in the second set (A) as not present.

5. The method of claim 1, wherein step iv includes caching the simplified policy (P') represented with a tree structure,
  wherein step v includes, whenever a sub-tree in the tree structure represents a Boolean expression but at least one of its children evaluates to a non-Boolean value, replacing the whole sub-tree by a variable ($v_i$).

6. The method of claim 5, wherein, in step v, the variable replacing the sub-tree comprises two associated Boolean variables for representing more than two possible values of the sub-tree.

7. The method of claim 6, the possible values being "true", "false" and "indeterminate".

8. The method of claim 1, wherein step v includes storing the correlation between each variable ($v_i$) and the sub-tree which it replaces.

9. The method of claim 1, wherein step vii includes assessing, for each request (r) in the subset (R) of requests, whether it corresponds to any of the variable assignments satisfying the logic expression; and, if it does, extracting this access request.

10. The method of claim 1, wherein step vi is performed by means of a SAT solver implemented in hardware and/or a computer executing software.

11. The method of claim 1,
  wherein step v further includes representing at least part of the simplified policy (P') as a binary decision diagram; and
  wherein step vi includes deriving all paths in the binary decision diagram evaluating to either true or false.

12. The method of claim 1, wherein step iii includes:
  determining an implicit reference defined by a value of one of the extracted attributes together with the ABAC policy; and
  fetching, in accordance with this implicit reference, at least one attribute value from a remote source.

13. A non-transitory computer-readable storage medium storing computer-executable instructions for performing a method of claim 1.

14. A computer system including a processing device coupled to a non-transitory data memory, the computer system being configured for real-time evaluation of a reverse query to an attribute-based access control (ABAC) policy (P) comprising functional expressions dependent on attributes, wherein the ABAC policy is evaluable for an access request if the access request assigns a value to at least one of said attributes, wherein an access decision resulting from said evaluation is enforceable to control access to one or more resources in a computer network,
  wherein the reverse query indicates a given access decision (d), which is one of permit access and deny access, and further indicating a subset (R) of two or more access requests to the ABAC policy, wherein the subset (R) is defined by constraints over the set of possible access requests,
  the computer system comprising:
    the data memory operable to store one or more ABAC policies;
    a partial request generation means operable to construct a partial request ($r_{partial}$) from the subset (R) of access requests;
    a policy decision partial evaluation means connected to the partial request generation means and to the data memory, and operable to reduce evaluate the ABAC policy (P) in accordance with the partial request ($r_{partial}$), thereby yielding a simplified policy (P');
    a translation means, connected to the policy decision means and operable to translate the simplified policy (P'), and the given decision (d) into a satisfiable logic proposition (F) in Boolean variables (vi, i=1, 2, . . . ), wherein the translation means is configured to replace, by a Boolean variable, any Boolean expression in the policy representing a comparison of an attribute and a fixed value;

an analyzing means, connected to the translation means and operable to derive all variable assignment ($c_j = [v_1 = x_{j1}, v_2 = x_{j2}, \ldots]$, $j = 1, 2, \ldots$) satisfying the logic proposition;

a conversion means connected to said analyzing means, and operable to process the variable assignments satisfying the logic proposition on the basis of a correlation between each Boolean variable and the comparison which it replaces; and a determining means operable to determining, from each variable assignment processed by said conversion means, a set of potential access requests for which the ABAC policy would evaluate to the given decision (d) and where each request belongs to subset R.

* * * * *